Sept. 13, 1955    J. T. GONDEK    2,717,451
DEPTH MICROMETER
Filed Jan. 6, 1951
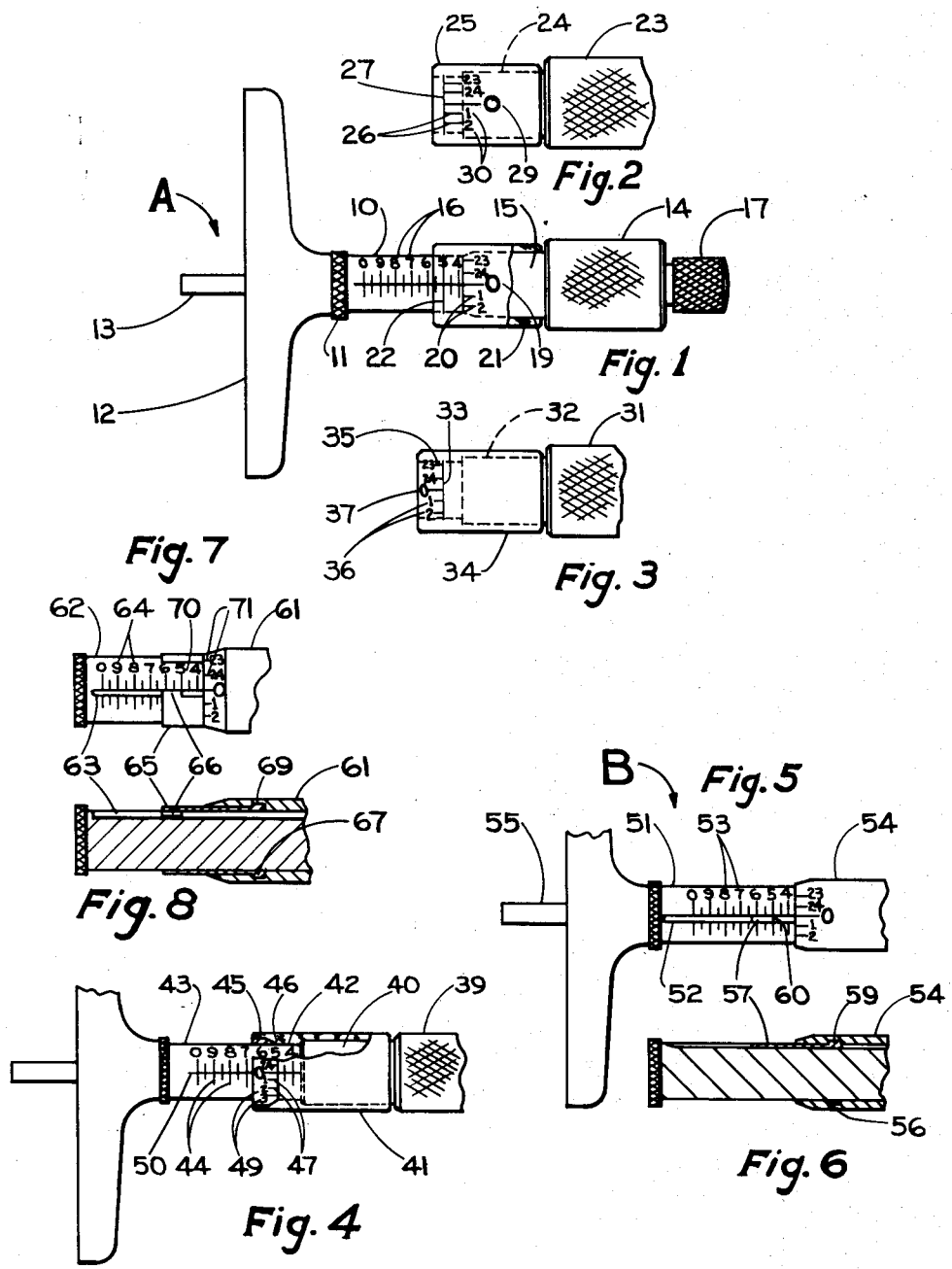
Inventor:
John T. Gondek
By Robert M. Dunning
Attorney

United States Patent Office 2,717,451
Patented Sept. 13, 1955

2,717,451

DEPTH MICROMETER

John T. Gondek, Minneapolis, Minn.

Application January 6, 1951, Serial No. 204,744

12 Claims. (Cl. 33—170)

My invention relates to an improvement in depth micrometer wherein it is desired to provide a more effective way of viewing the indicating marks.

A depth micrometer differs from a micrometer used to measure thickness in that the micrometer thimble of the instrument used to measure depth usually overlies the lower numbers of the indicator scale. Therefore when the micrometer is designed to indicate variations in depth of an inch, all of the numerals of the scale are concealed when the maximum depth is being indicated. Furthermore, the first decimal of each indication is always concealed by the thimble so that errors are often made in reading the scale. This is particularly true if the person reading the scale commonly uses a thickness measuring micrometer.

An object of the present invention lies in the provision of a means of indicating a depth reading at a point spaced from the opaque thimble. As a result numerals on both sides of the depth gage line are visible when the micrometer reading is made.

A feature of the present invention lies in the provision of a micrometer capable of providing an increased visibility of the depth scale. By enabling the operator to see numbers on both sides of the depth gage line associated with the thimble most common errors in reading the scale may be eliminated.

It is a feature of the preferred form of my invention to provide a depth micrometer having a transparent sleeve encircling the thimble or forming an extension thereof. A depth gage line may thus be provided on the extension at a point spaced from the end of the opaque thimble, thereby providing a means of eliminating error in reading the scale.

An added feature of a modified form of the invention lies in the provision of a pointer or similar gage connected to the thimble for longitudinal movement thereby, but held from rotation relative to the hub about which the thimble rotates. This pointer or indicator thus moves longitudinally of the micrometer hub at a point spaced from the end of the thimble to provide a better view of the micrometer scale.

These and other objects and novel features of my invention will be more clearly and fully set forth in the following specification and claims.

In the drawings forming a part of my specification:

Figure 1 is a plan view of a depth micrometer showing a transparent sleeve mounted upon the thimble to form an extension thereof.

Figure 2 is a detail view of a portion of the thimble and sleeve showing a different arrangement of gage marks.

Figure 3 is a view similar to Figures 1 and 2 showing still another arrangement of marks on the sleeve.

Figure 4 is a plan view partly broken away of another form of micrometer construction.

Figure 5 is a plan view of a modified form of indicator construction.

Figure 6 is a sectional view through the construction illustrated in Figure 5.

Figure 7 is a plan view of a slightly different form of micrometer construction.

Figure 8 is a sectional view through the construction shown in Figure 7.

The micrometer A includes a hub 10 which is connected at 11 to a transversely extending base 12. The base 12 is designed to bridge a recess or aperture, the depth of which is to be measured.

As is usual in micrometers of the type in question, a spindle 13 is slidably supported within the hub 10 to move longitudinally of the hub and to project beyond the base 12 of the hub. The spindle 13 is usually externally threaded to fit cooperable internal threads within the hub 10 and is connected to the cap 14 forming a part of, or connected to, the thimble 15. The thimble 15 normally encircles the hub 10 and moves longitudinally thereof to overlie more or less of the indicating numerals 16 on the hub 10. A ratchet device 17 is usually provided on the cap 14 by means of which the cap and thimble may be rotated. This ratchet device is capable of rotating relative to the cap and thimble when the spindle 13 reaches the extremity of the recess being measured.

The gage marks 16 on the hub 10 are usually arranged at equal distances apart, and in usual practice with the measuring system in use in this country, a length of one inch is divided into tenths and the tenths are usually divided into four equal distances by three gage marks. The thimble 15 is usually provided with a zero mark 19 and the periphery of the thimble is divided by gage marks 20 into twenty-five equal divisions. For each rotation of the thimble 15 the thimble advances a distance equal to $25/1000$ of an inch. The gage marks 20 ordinarily provide a direct reading in thousandths of an inch. This reading must be added to the distance as indicated by the gage marks 16 in order to provide the depth reading.

As the thimble 15 usually covers the lower gage numerals on the scale 16, it is necessary to note the position of the sleeve end by reference to the next higher numeral on the scale. This fact gives rise to error in the reading of the depth, the first numeral visible being often used as the first decimal instead of the next lower numeral. It is this difficulty which the present invention is designed to avoid.

I provide a sleeve 21 of plastic or other transparent material which is pressed onto the thimble 15 or otherwise attached thereto to form an extension thereof. This sleeve 21 is provided upon its inner surface with a depth gage line 22 spaced a predetermined distance from the end of the thimble 15 and which gage line resides in a plane normal to the axis of the spindle 13. In the particular illustration shown in Figure 1 of the drawings, the gage line 22 is $150/1000$ of an inch beyond the extremity of the thimble 15. The sleeve 21 rotates with the thimble 15 and moves therewith as an integral part thereof. However, the depth reading is obtained from the position of the depth gage line 22 rather than from the end of the thimble 15.

It will be noted that as the gage line 22 is slightly more than $1/10$ of an inch beyond the next lower numeral, the number forming the first number of the decimal is always visible when the reading is made. As a result fewer errors are made in reading the depth gage and the gage may be read in a somewhat more normal manner than in depth micrometers of the usual type.

In Figure 2 of the drawings I disclose a portion of a micrometer including the micrometer cap 23 and the thimble 24 attached thereto. A sleeve 25 of transparent plastic or other suitable transparent material is pressed upon or otherwise connected to the thimble 24 for movement therewith. This structure differs from the previously described construction only in the fact that the angularly spaced gage lines 26, as well as the depth gage line 27 are formed in the sleeve 25 rather than upon the thimble 24. Alternatively the gage linees 26 on the transparent sleeve 25 may be aligned with cooperable gage lines on the thimble 24. The thimble 24 still bears the zero marking 29 and the numerals 30 which cooperate with the angular spaced gage lines 26.

The structure illustrated in Figure 3 of the drawings is another slight modification of the structure shown in Figures 1 and 2. In the structure shown in Figure 3, the micrometer cap 31 is attached to the thimble 32 which bears no marking whatsoever. A depth gage line 33 is provided on the inner surface of a transparent sleeve 34 secured to the thimble 32 and projecting beyond the same. The depth gage line 33 is spaced from the extremity of the thimble so that a portion of the micrometer hub on either side of the gage line 33 is visible through the sleeve 34.

In this form of construction gage lines 35 are provided on the transparent sleeve together with identifying numerals 36. The zero marking 37 is also provided on the transparent sleeve. In other words, the structure shown in Figure 3 differs from the previously described constructions only in the fact that all of the gage marks and identifying indicia are on the transparent sleeve rather than partially or wholly on the micrometer thimble.

In Figure 4 of the drawings I disclose a micrometer which again differs slightly in detail from those previously described. This micrometer is shown as including a cap 39 having a thimble 40 attached thereto. A transparent sleeve 41 is pressed upon, or is otherwise connected to, the thimble 40 for movement in unison therewith. The sleeve 41 projects beyond the extremity of the thimble 40 and preferably is provided with a reduced internal diameter portion 42 which closely encircles the hub 43 of the micrometer. The micrometer hub 43 is provided with the usual scale or series of gage marks 44 cooperable with the gage marks movable with the thimble 40.

In the form of construction illustrated in Figure 4, a ring 45 of metal or other suitable material is provided with an edge 46 spaced from the extremity of the thimble 40. Thus a ring-shaped open part is provided between the ring 45 and the thimble 40 through which the gage marks 44 on the micrometer hub 43 may be viewed. The ring 45 is provided with angularly spaced gage marks 47 and corresponding identifying numerals 49 which cooperate with a longitudinal line 50 on the hub 43 of the micrometer.

The space between the ring 45 and the thimble 40 is sufficient to at all times expose the numeral next lower upon the scale from the edge 46 of the ring 45 which acts as the depth gage line. As a result it is an easy matter to read the micrometer without error.

In Figures 5 and 6 of the drawings I disclose a micrometer B which is of a somewhat different style from that previously described, but which includes some of the same advantages. In the construction shown in these figures, the micrometer hub 51 is provided with a longitudinally extending groove 52 therein closely adjacent the scale 53 or series of gage marks designed to designate depth. A thimble 54 of the conventional type is rotatable about the hub 51 and is connected to the depth spindle 55 to indicate the position thereof. The spindle 55 and the thimble 54 are arranged to move longitudinally in unison.

The thimble 54 is provided with a cylindrical groove 56 in its inner surface. An indicator 57 is slidable within the groove 52 and is provided with an enlarged extremity 59 designed to extend outwardly into the groove 56. Thus the indicator 57 will move longitudinally in unison with the thimble 54 but will not rotate therewith. As a result the indicator 57 is at all times closely adjacent to the scale 53.

A depth gage pointer or mark 60 is provided upon the indicator 57 to cooperate with the gage marks of the scale 53. The mark 60 is preferably spaced from the extremity of the thimble 54 a distance sufficient to always expose the next lower numeral on the scale 54. As a result the first numeral of the depth measurement is at all times visible when the depth reading is being made and many of the errors usually found in reading depth gages of the type in question are eliminated.

The structure illustrated in Figures 7 and 8 of the drawings is similar in theory to that just described in Figures 5 and 6. In the structure shown in Figures 7 and 8, the thimble 61 is slidable longitudinally of the hub 62. A groove 63 is provided in the external surface of the hub extending longitudinally thereof. A scale 64 is provided on the hub adjacent to the groove 63.

A substantially ring-shaped member 65 is provided with a down-turned end 66 engageable in the slot 63 to hold the sleeve 65 from rotation. The sleeve 65 extends within the end of the thimble 61 and is provided with an enlarged edge 67 engageable within an internal groove 69 in the in inner surface of the thimble 61. Cooperation between the enlargement 67 and the groove 69 causes longitudinal movement of the sleeve 65 with the thimble 61. Engagement of the projection 66 with the groove 63 prevents rotation of the sleeve 65. A notch 70 is provided between the projection 65 and a spaced portion of the sleeve to expose the scale 64.

The projection 66 is spaced from the end of the sleeve 61 a distance sufficient to permit a lower numeral on the scale 64 to be always visible in the notch 70. The depth gage line is measured from an edge of the projection 66 which edge resides in a plane normal to the axis of the spindle. Angularly spaced guide marks 71 and suitable identifying numerals are cooperable with an edge of the slot 63 to provide a depth reading. The thimble 61, when rotated, acts to extend or retract the micrometer spindle.

In all of the foregoing structures, it will be noted that the depth gage line at which the depth reading is made, is spaced from the ends of the opaque thimble of the micrometer, thereby exposing the lower numeral on the scale extending along the micrometer hub. The structure illustrated in Figures 1 through 4 of the drawings incorporates a transparent sleeve through which portions of the scale may be observed, while the structure shown in Figures 5 through 8 of the drawings, shows a pointer supported for longitudinal movement with the micrometer thimble, but held from rotation relative to the micrometer hub. While the two structures are not exactly equivalent, the first described structures are usually somewhat easier to make without extreme precision. Each form of construction has its individual advantages and may be successfully employed to provide a more satisfactory instrument.

In accordance with the patent statutes, I have described the principles of construction and operation of my depth micrometer, and while I have endeavored to set forth the best embodiment thereof, I desire to have it understood that obvious changes may be made within the scope of the following claims without departing from the spirit of my invention.

I claim:

1. A micrometer including a hub, a thimble rotatable about said hub and movable longitudinally thereof, a spindle connected to said thimble for longitudinal movement in conjunction therewith, a series of scale marks on said hub, and means connected to said thimble for longitudinal movement in unison therewith and projecting beyond said thimble, and an indicator on said last named means cooperable with said scale marks at a point spaced from said thimble, said indicator including a reference means arranged on a plane normal to the axis of the spindle, said reference means being spaced from the end of the thimble and cooperable with the scale marks of the hub to indicate the position of said hub relative to said thimble, the portion of the scale marks between said reference means and said thimble being visible beyond the end of the thimble.

2. A micrometer including a micrometer hub, a thimble longitudinally movable over said hub, a micrometer spindle connected to said thimble for movement in conjunction therewith, a scale on said hub and extending longitudinally thereof, and means supported on said hub and connected to said thimble for longitudinal movement with said thimble, said last named means extending beyond said thimble, and cooperable indicator means on said last named means cooperable with said scale at a point spaced from the end of said thimble, said indicator means including a reference means arranged on a plane normal to the axis of the spindle, said reference means being spaced from the end of the thimble and cooperable with the scale of the hub to indicate the position of said hub relative to said thimble, the portion of the scale between said reference means and said thimble being visible beyond the end of the thimble.

3. The structure described in claim 1 and in which the means supported on said hub comprises a transparent member.

4. The structure described in claim 1 and in which the means supported upon said hub comprises a transparent sleeve.

5. The structure described in claim 1 and in which the means supported upon the hub comprises a pointer, and in which the hub is provided with a longitudinal groove adjacent said scale for holding said pointer from rotation relative to the hub.

6. A micrometer including a hub, a thimble rotatably supported for movement upon said hub longitudinally thereof, a spindle connected to said thimble for longitudinal movement in conjunction therewith, a transparent sleeve supported by said thimble and movable therewith, a gage line on said transparent sleeve, and a scale extending longitudinally of said hub including identifying means cooperable with said gage line.

7. The structure described on claim 6 and including angularly spaced gage lines on said thimble and identifying numerals on said thimble adjacent said spaced gage lines.

8. The structure described in claim 6 and including angularly spaced gage lines on said sleeve and cooperable numerals on said thimble.

9. The structure described in claim 6 and including angularly spaced gage lines and identifying numerals on said sleeve.

10. The structure described in claim 6 and including a ring inwardly of said sleeve and spaced from the end of said thimble and provided with angularly spaced gage marks thereupon.

11. The structure described in claim 1 in which said hub is provided with an elongated groove and said series of scale marks is adjacent said groove, and said indicator comprises a pointer supported in said groove projecting beyond the end of said thimble.

12. The structure described in claim 11 and in which the pointer comprises a shell partially encircling said hub and having a notch therein through which said scale marks are visible.

References Cited in the file of this patent

UNITED STATES PATENTS

| | | |
|---|---|---|
| 1,315,318 | Maddison | Sept. 9, 1919 |
| 1,317,747 | Whatley | Oct. 7, 1919 |
| 1,608,356 | Bell | Nov. 23, 1926 |
| 2,357,437 | Tilton | Sept. 5, 1944 |
| 2,590,455 | Pittenger | Mar. 25, 1952 |

FOREIGN PATENTS

| | | |
|---|---|---|
| 342,757 | Great Britain | Feb. 5, 1931 |